March 9, 1965  E. J. BURKE  3,172,705
FEED MEANS FOR SOLDERING APPARATUS
Original Filed May 9, 1960  7 Sheets-Sheet 1
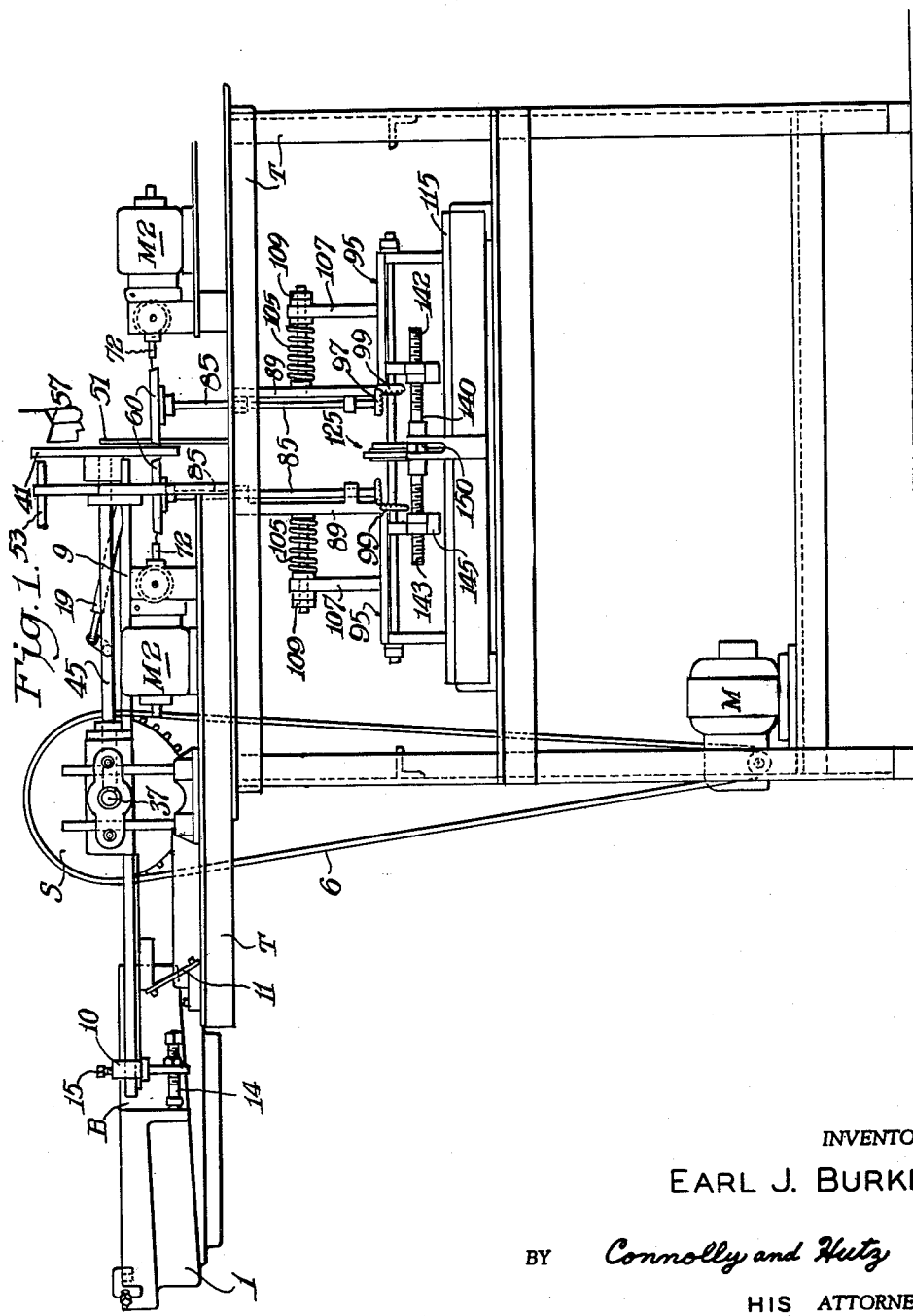
INVENTOR
EARL J. BURKE
BY Connolly and Hutz
HIS ATTORNEYS

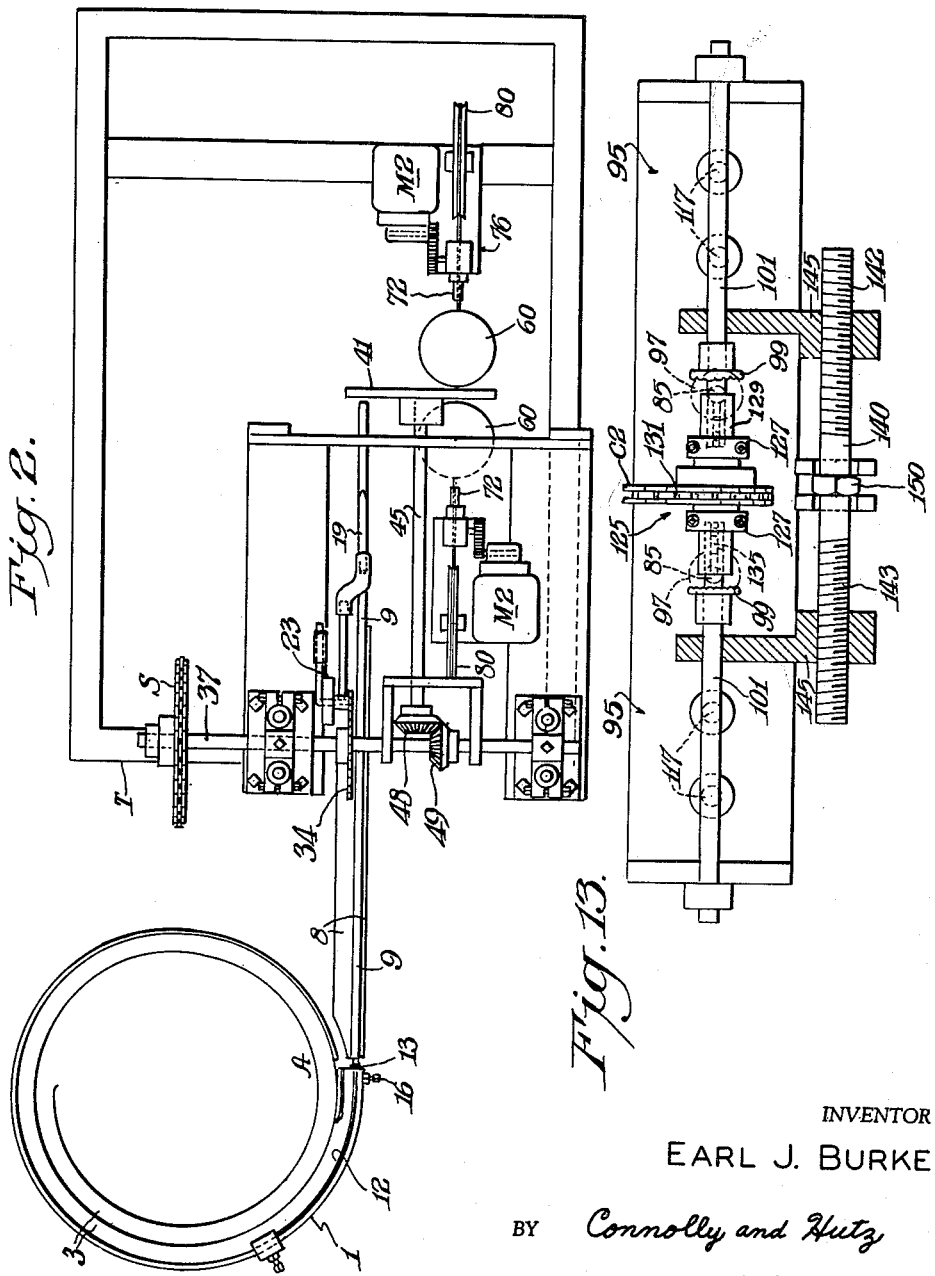

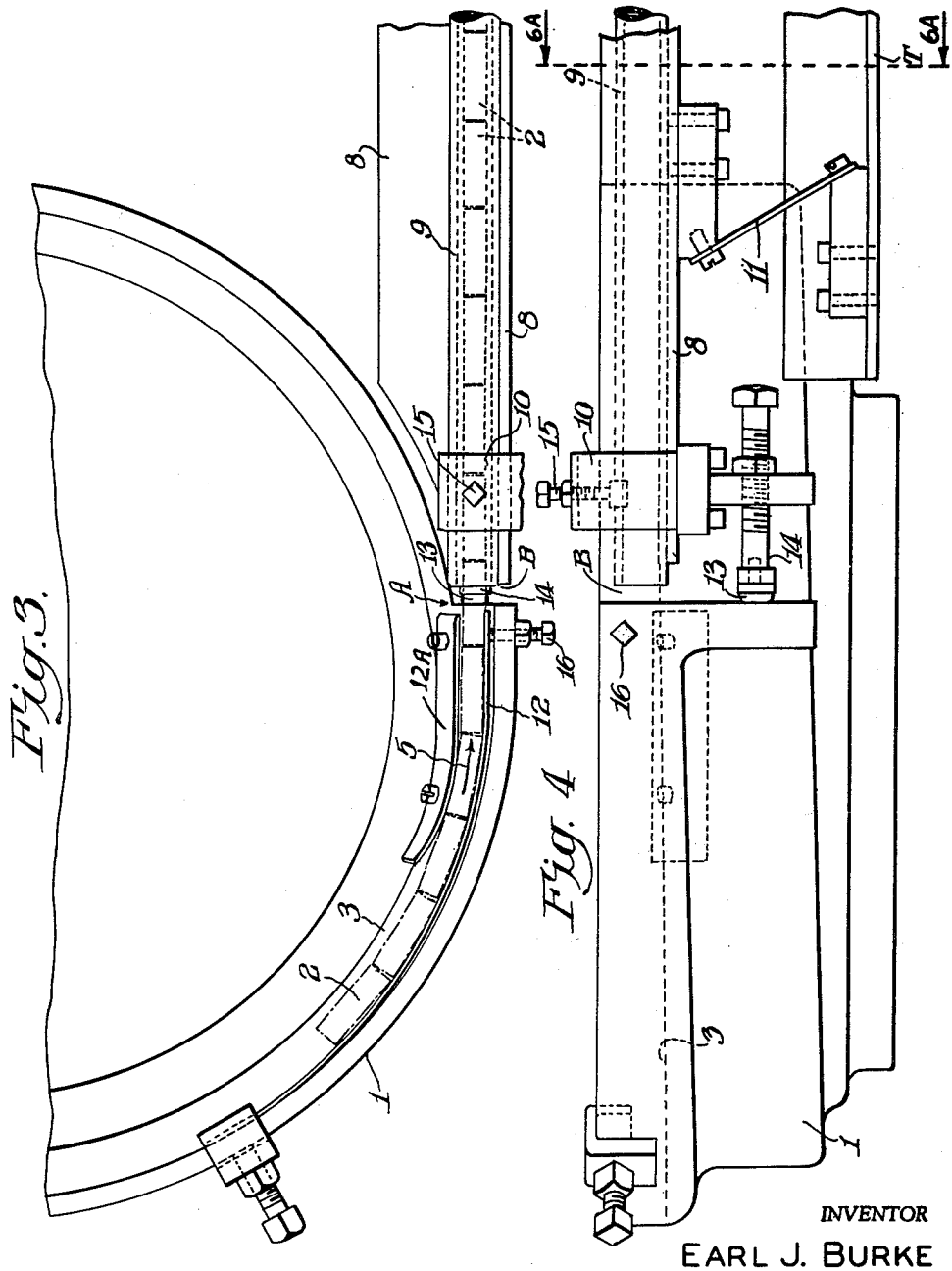

March 9, 1965     E. J. BURKE     3,172,705
FEED MEANS FOR SOLDERING APPARATUS
Original Filed May 9, 1960     7 Sheets-Sheet 4
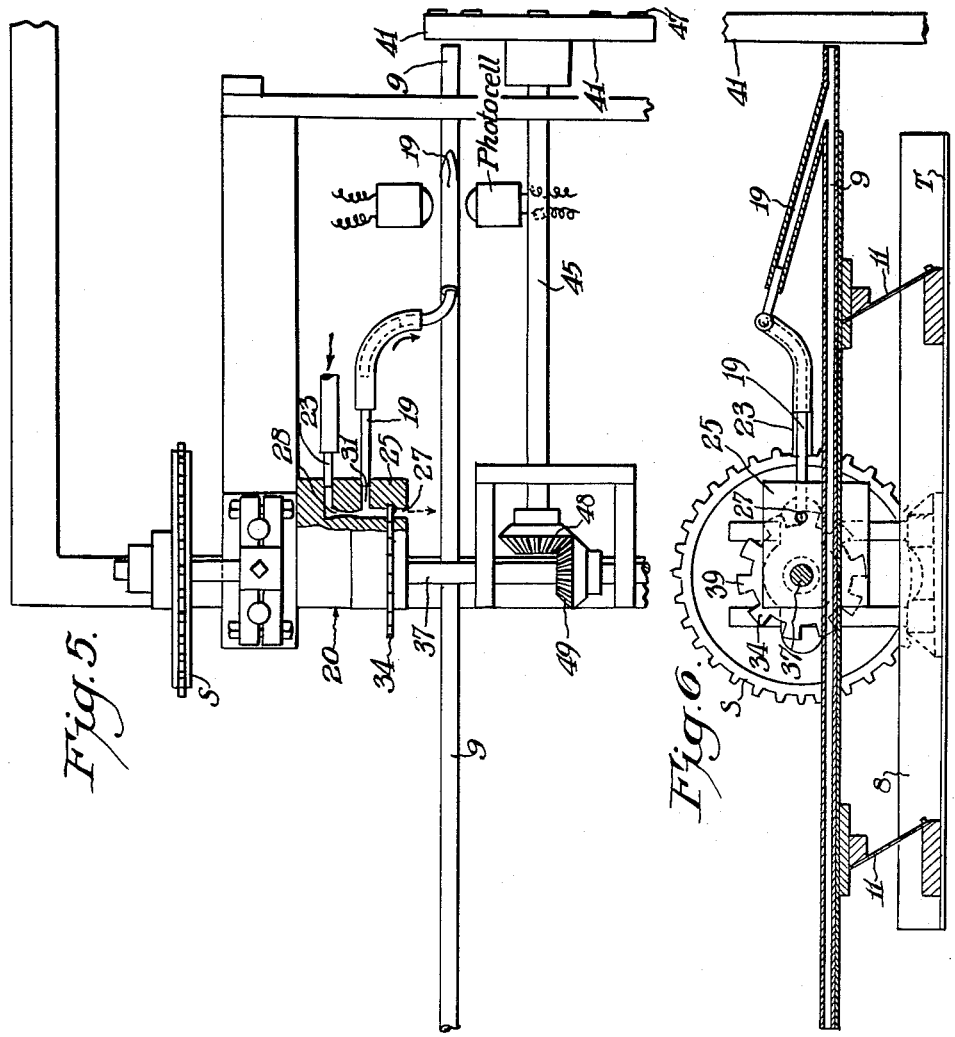
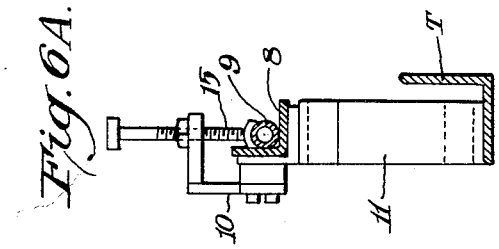
INVENTOR
EARL J. BURKE
BY Connolly and Hutz
HIS ATTORNEYS

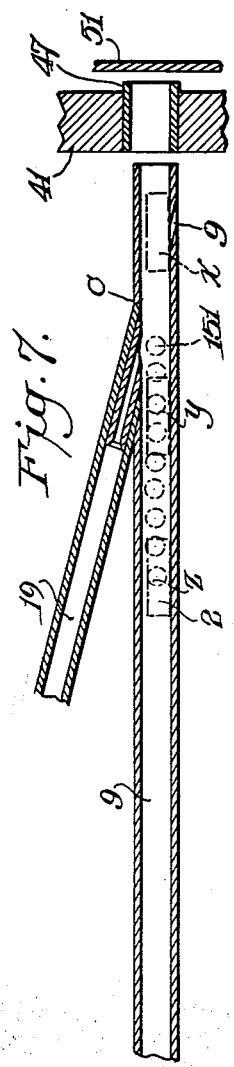
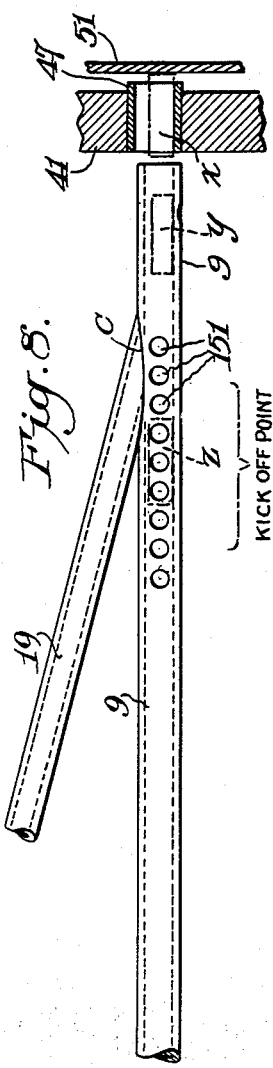
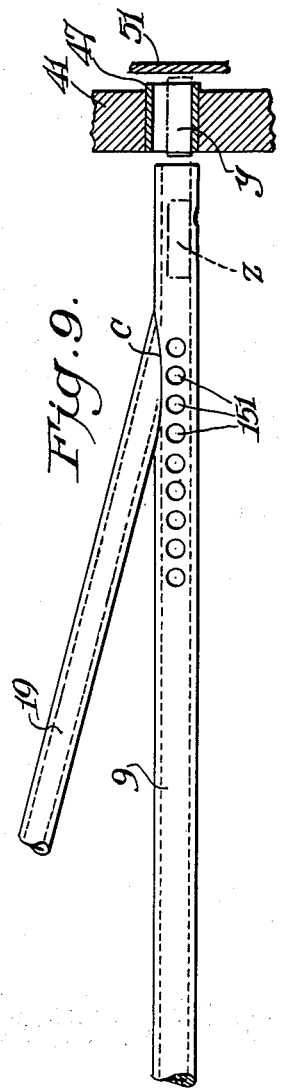

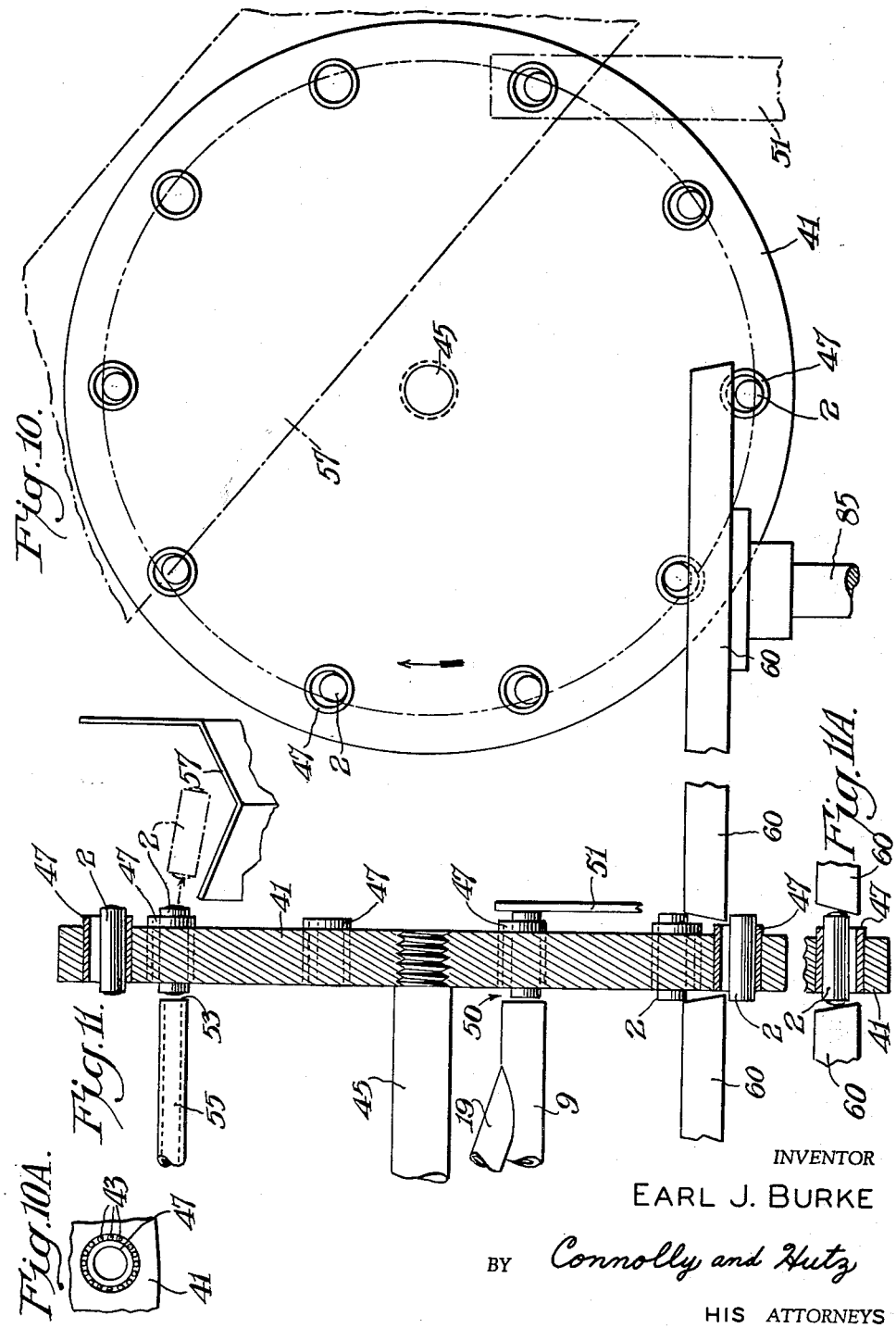

March 9, 1965 E. J. BURKE 3,172,705
FEED MEANS FOR SOLDERING APPARATUS
Original Filed May 9, 1960 7 Sheets-Sheet 7
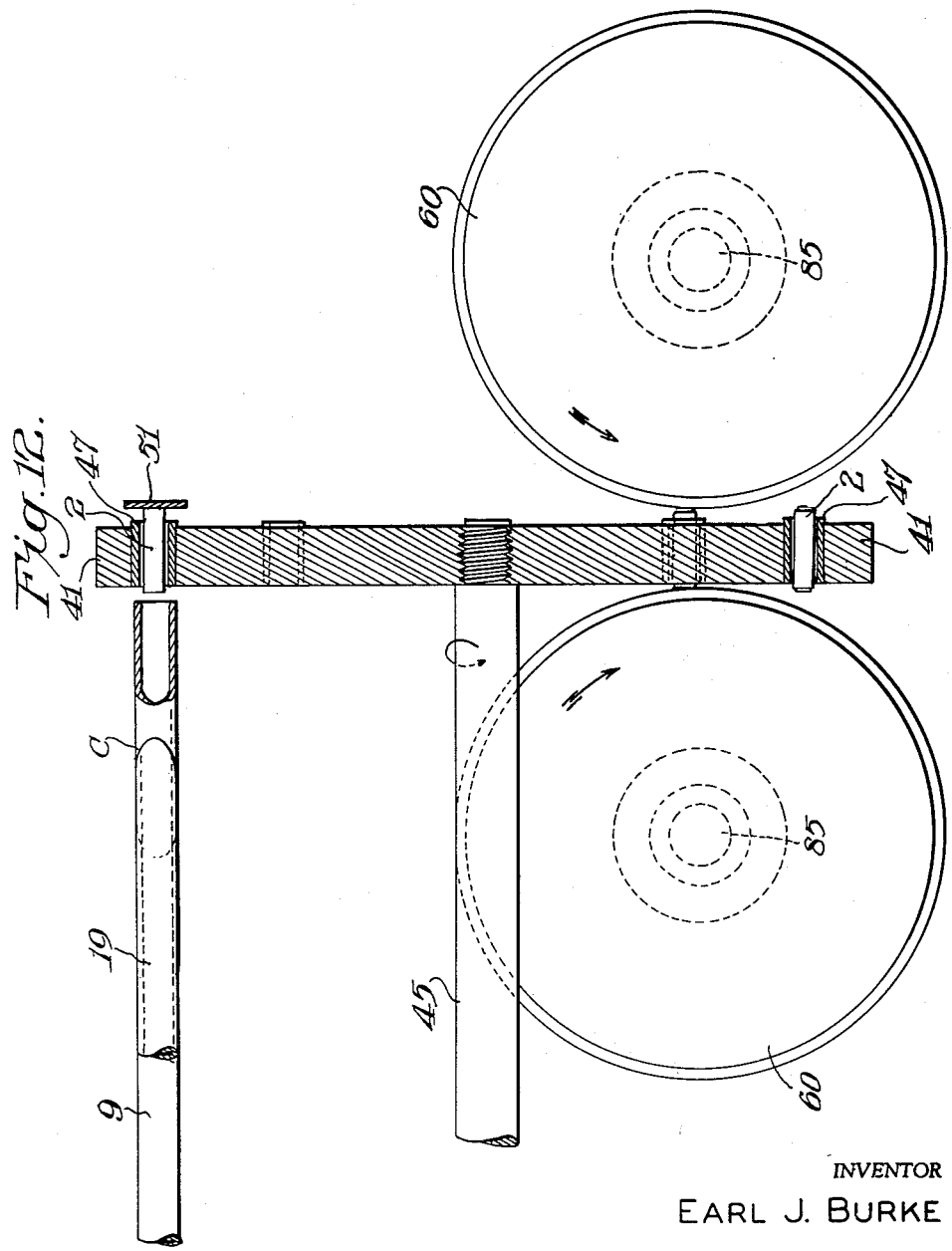
INVENTOR
EARL J. BURKE
BY Connolly and Hutz
HIS ATTORNEYS

United States Patent Office 3,172,705
Patented Mar. 9, 1965

3,172,705
FEED MEANS FOR SOLDERING APPARATUS
Earl J. Burke, Stamford, Vt., assignor to Sprague Electric Company, North Adams, Mass., a corporation of Massachusetts
Original application May 9, 1960, Ser. No. 27,562. Divided and this application Dec. 31, 1962, Ser. No. 258,940
3 Claims. (Cl. 302—2)

This is a division of application Serial No. 27,562 filed May 9, 1960, now Patent No. 3,172,387, issued March 9, 1965.

The present invention relates to a soldering apparatus for automatically soldering the ends of cylindrical articles. In particular, the invention relates to a soldering apparatus for soldering the ends of small rolled capacitor sections which are commonly and extensively used in a great variety of electrical appliances such as radios, television sets, etc.

With the use of capacitor sections in electrical appliances, a conductive member such as a conductive wire or lead must first be affixed through a solder connection to each end of the capacitor section. Therefore, during the capacitor section manufacture, an amount of solder is applied to each end of the capacitor section to seal off the ends of the capacitor section and to provide solder supports to which the conductive members may be attached.

It is, therefore, one object of the present invention to provide a novel and improved soldering apparatus which automaticallly applies solder to the end of cylindrical articles such as capacitor sections in a finished, professional manner.

A further object of the invention is to provide a soldering apparatus of the above object wherein capacitor sections are rapidly processed through the soldering apparatus.

Still another object of the invention is to provide a soldering apparatus of the above objects wherein the capacitor sections are automatically fed in progressive manner and in timed relationship to the soldering stations.

Among other objects, a further object of the invention is to provide in the soldering apparatus of the above objects, automatic capacitor section discharge means for discharging the capacitor sections from the apparatus after the capacitor section ends have been soldered.

Other objects and advantages of the invention will become apparent from a study of the following description and drawings wherein:

FIG. 1 is a side view of the apparatus;

FIG. 2 is a top view of the apparatus;

FIG. 3 is a top view in detail of the connection between the supply hopper and the feed chute;

FIG. 4 is a side elevation in detail of the connection between the supply hopper and the feed chute as seen in the direction of the arrows in FIG. 3;

FIG. 5 is a top view of the feeding means for automatically feeding the capacitors toward the soldering station;

FIG. 6 is an elevation of the feeding means of FIG. 5;

FIG. 6A is a section taken along lines 6A—6A of FIG. 6;

FIG. 7 is a longitudinal section showing in detail the air line in the feeding means;

FIG. 8 is a longitudinal elevation of the air line of the feeding means in one stage of operation;

FIG. 9 is a longitudinal elevation of the air line of the feed means at another stage in the operation;

FIG. 10 is an end view of the conveying means for conveying the capacitor sections to, through, and beyond the soldering stations;

FIG. 10A is an elevation of a portion of the conveyor of FIG. 10 showing a bearing detail;

FIG. 11 is a side view partially in section of the conveyor of FIG. 10;

FIG. 11A is a partial side view partially in section of the conveyor of FIG. 10 showing a different position from FIG. 11;

FIG. 12 is a plan view of the end of the feeding means, the conveyor, and the soldering wheels;

FIG. 13 is a detail of the means for controlling the lateral movement of the soldering stations.

Briefly, the soldering apparatus comprises a vibratory supply hopper into which the capacitor sections are initially loaded and from which they are fed in progressive manner toward the main body of the soldering apparatus secured to a table frame. A vibratory rail which supports a feed tube is secured to the table frame. The tube receives the capacitor sections from the supply hopper and passes them toward a turret wheel conveyor for the capacitor sections, which conveyor is also supported by the table frame. Preferably, although not essential, means are provided in connection with the feed tube for propelling the capacitor sections in timed relationship to a turret wheel. A series of ferrules extend through the turret wheel around the peripheral portion of the wheel progressively receiving the capacitor section propelled from the tube as the wheel rotates. A pair of spaced apart and opposed solder applying discs are rotatably supported adjacent the turret wheel in such a manner that the peripheral portion of the turret wheel which houses the ferrules passes between the disc peripheries so that the ends of the capacitor sections housed in the ferrules will contact the peripheries of the soldering discs as the wheel rotates therebetween. Air expulsion means directed toward the path of travel assumed by the ferrules housed in the turret wheel conveyor expels the capacitor sections from the ferrules after solder has been applied to the capacitor section ends.

The capacitor sections are fed into the conveying turret wheel under the action of pneumatic means. The sections are introduced into ferrules in the turret wheel one at a time and timed to the rotation of the wheel so as to avoid jamming of the sections together or missing a ferrule.

Referring now more particularly to FIGS. 1 and 2 of the drawings, a table frame T is provided for supporting the various cooperating members and elements of the apparatus. The cylindrical articles such as capacitor sections 8 (see FIG. 11) are initially loaded into a vibratory supply hopper 1. A seen more clearly in FIG. 2, an ascending spiral ledge 3 is provided along the interior wall of the hopper 1. As the hopper 1 is vibrated, the capacitor sections 2 gradually work themselves up the spiral ledge 3 to the top of the hopper to a point indicated by arrow 5 in FIG. 3. Since the vibratory hopper is a commercial item and forms no part of the present invention except in combination with the other elements of the apparatus, the specific make-up of the hopper has not been shown. Any suitable commercial vibratory hopper such as that commercially sold by the Syntron Company of Homer City, Pennsylvania, and known as "Model C" may be used to provide the proper vibratory motion to the hopper 1. From point 5 of the hopper 1, the capacitor sections 2 pass to a rail 8 which supports a feed tube 9 and which is shown more clearly in FIGS. 6 and 6A of the drawings.

As seen in FIGS. 6 and 6A, the rail 8 is supported by spring strip mountings 11 secured to the table frame T. The rail 8 shown is of L-shape and is supported so that one leg of the L extends outwardly and the other extends upwardly. However, it may take other forms such a V-shaped rail. A section of tubing, preferably of a plastic nature, is supported by the rail 8. The feed tube 9 is preferably formed of a clear plastic material so that the progress of the capacitor sections passing through the tube may be observed.

The connection between the hopper 1 and the tube 9 is shown at point A in the plan view of FIG. 3 and the side view of FIG. 4. As seen in FIG. 3, this junction is adjacent to the end of the spiral ledge 3 indicated by the arrow 5, as mentioned above. The sections move across the ledge 3 and into the tube 9. This movement is automatic as provided by the proper vibratory motion. This vibratory motion is transmitted to the tube 9 so as to continue the progressive advancement of the sections 2 through the tube 9 and away from the supply hopper 1. In this manner, the sections 2 are fed down the tube 9 to the point where the pneumatic feeding carries them further, as described in greater detail below.

The joint at A is shown in detail in FIGS. 3 and 4. The hopper 1 is shown in contact with a bumper 14. The bumper 14 is attached to the rail 8 by a bracket 10. As seen in the plan view of FIG. 3, the bumper 14 has a resilient face 13 which comes into contact with the hopper 1 at the end of the spiral ledge 3. In the side elevation of FIG. 4, the positioning of the bumper 14 beneath the rail 8 shows the relationship between the parts. A space is provided between the end of the spiral ledge 3 and the end of the tube 9. This space indicated at B is substantially less than the axial length of the shortest section 2 to be fed across the connection. Referring again to FIG. 3, the hopper 1 is provided with a guide plate 12. The guide plate 12 is clamped to the upright side of the hopper 1 and is a long leaf of a resilient material. A set screw 16 positioned in the side of the hopper 1 bears adjustably against the guide plate 12 to vary its lateral position across the end of the spiral ledge 3 and the adjacent opening of the tube 9. The sections 2 shown on the ledge 3 are thus adjustably positioned with respect to the centerline of the adjacent tube 9 in their travel across the opening B in the connection A. An inner plate 12A is attached to the ledge 3. The plate 12A conforms to the curvature of the wall of the hopper 1 but only at the end removed from the opening B. At the end adjacent to the opening B, the plate 12A forms a tangent to the curve of the hopper wall. The plate 12A acts as a deflector to remove the excess sections 2 in the movement of the sections 2 toward the joint between hopper 1 and tube 9. The section which are piled up on top of the sections destined to feed into the tube 9 topple over the upper edge of the plate 12A and fall back into the hopper 1. It is noted that the bumper 14 is axially movable in the bracket 10. This permits adjustment of the pressure applied to the rail 8 through the bumper 14. As the rail 8 is supported by the spring strip mountings 11, the throw of the rail 8 by the vibrations of the hopper 1 will be influenced by the degree of deflection of the mountings 11 created through the adjustment of the axial positioning of bumper 14 in the bracket 10. A threaded clamp 15 is provided for holding the end of the tube 9 in the bracket 10. Vibratory motion in the rail 8 transmitted from the hopper 1 advances the sections 2 along the tube 9.

As seen in FIGS. 5 and 6, an air line 19 is connected in communicating relationship with the tube 9 at or adjacent to the discharge end of the tube, the purpose of which is explained below.

As mentioned above, the sections 2 are preferably advanced toward the soldering stations in timed relationship by a timing assembly. Such timing assembly, however, is not necessarily essential for the successful operation of the invention. This timing assembly generally indicated as 20 in FIG. 5 generally consists of a main air supply 23 partially housed in support block 25 and through which air is continuously passed to be alternately discharged into the atmosphere from the discharge end 27 of the main supply line 23 and into the air line 19 through a connection 31 formed within the block 25 and which opens into the main supply line 23 at a point prior to the discharge end 27 of the line 23.

In one form of regulating the pneumatic advancing means, the air is intermittently blown through the air line 19. A means for creating this intermittent blasting of air through line 19 is illustrated in FIGS. 5 and 6. In FIG. 5 the air is alternately channeled from the main supply line 23 through the connection 31 and air line 19 by a blade wheel 34 which is supported upon a rotatable shaft 37. FIG. 1 shows the shaft 37 journalled to the frame T. The shaft 37 is turned by a chain 6 which engages sprocket S on the shaft 37. The chain 6 is driven by the motor M. As seen in the plan view of FIG. 2, the sprocket 3 turns on a horizontal axis which is the shaft 37. The air control means illustrated in FIGS. 5 and 6 is not shown in FIG. 2. The blade wheel 34 is mounted on the shaft 37 between the sprocket S and other gearing described in greater detail below in connection with FIG. 2. Referring again to FIG. 6, the wheel 34 has radially extending, spaced apart blades 39 and, as shown in FIG. 5, the blade wheel 34 is so mounted that the blades pass through the block 25 and the main supply line 23 to periodically cut off the main air supply line 23 at a point beyond the air line connection 31 whereby amounts of air are periodically shunted into the air line 19. The air under pressure enters the tube 9 on the track 8 giving the leading section 2 a push which rapidly propels the section toward a turret wheel 41 which receives the section in a ferrule 47 and conveys it to a soldering station.

A preferred means for controlling the timing of the feed of sections 2 to the revolution of the ferrules 47 is described. Referring first to FIG. 2, the tube 9 extends from the hopper 1 to the turret wheel 41 and carries the sections 2 in their transfer from the hopper 1 to the turret wheel 41. The sections 2 to be processed in this apparatus exhibit a wide variety of physical characteristics. They vary in shape, both in length and girth, in weight and in softness. In turn, these characteristics vary the friction between the sections and the inner surface of the tube 9 and also the volume of the internal bore of tube 9 occupied by the sections. The sections are moved through the tube 9 by a combination of forces. The one force that initially feeds the sections 2 into the tube 9 is the vibratory shaking of the sections 2 derived from the motion of the hopper 1. The other force is air pressure or suction exerted on the sections 2 while within the tube 9. The air pressure is applied to the sections 2 from the connection A of the tube 9 (see FIG. 3) at the hopper 1, through the air line 19 (see FIG. 7) and also through apertures 151 formed in the tube 9 adjacent a punction C of the air line 19 with the tube 9 (see FIG. 8).

The sections are moved into the turret wheel 41 so that the ferrules 47 can receive the sections from the tube 9 individually and successively without an interruption which could cause one of the ferrules 47 to pass empty to the soldering station. It is the purpose of the movement thus to provide the sections so that they will be regularly presented to the turret wheel 41 and so that any interruption of this regular presentation will be avoided. As pointed out above, a general movement of the sections 2 is provided by the vibration of the tube 9. In addition, the pneumatic advancement of the sections is effected by means of the air stream which is supplied through the tube 19. These combined means of movement must result in a continuous feed which is free of clogging or jamming. It must be rapid and so arranged as to continually present a section 2 to the turret wheel 41 at the phase in the rotation of the wheel 41 during which an empty ferrule 47 is presented to the end of the tube 9.

The pneumatic advancement of the sections 2 acts upon the sections 2 by a balance of the various factors providing air pressure on the sections. These factors are the cross-sectional area of the feeder tube 19, the area of the apertures 151, the velocity of the air and the angle of forced introduction of the air into the feeder tube as well as the relative proportions of the individual sections. As a result of this balance there is provided an effective, section-moving pneumatic action at the end of the tube 9 adjacent the turret wheel 41. This pneumatic action acts upon the sections 2 and operates on the sections 2 either one at a time or on more of the sections 2 at one time. It acts upon the sections 2 to move them into position for reception by an empty ferrule 47. For example, the air which is forced from the air line 19 into the tube 9 blows out through the end of the tube 9 and thus exerts a pressure on a section 2 sitting in the end of the tube 9 so that the section 2 may be moved into the ferrule 47 brought up with the motion of the wheel 41.

In FIG. 7 the air line 19 and its joint C with the tube 9 are shown in juxtaposition with the turret wheel 41. The air line 19 makes the joint C with the tube 9 at an acute angle $\theta$ so that the forced air stream is directed into the feeder tube 9 toward the open end. This directed angle of the air line 19 and its introduced air stream may be varied to adjust the balance of factors which provide air pressure on the sections. This directed angle determines the division of the forced air stream as it enters the feeder tube 9. The smaller the angle $\theta$ of FIG. 7, the greater will be the proportion of the forced air stream directed through the open end of the feeder tube 9 and the less will be the proportion of the forced air stream which turns up the tube toward the apertures 151. Conversely, increasing the angle $\theta$ increases the proportion of forced air stream moving away from the open end of the tube 9. As will be described in greater detail below, the angle $\theta$ also influences the flow of air into the tube 9 through the apertures 151 during the intake of air into the air line 19.

As shown in FIG. 8, the tube 9, according to one form of this invention, is provided with the apertures 151. With this form of section conduit the pneumatic action provides a seizing action which interrupts the travel of the sections 2 through the tube 9 and causes them to be moved to the turret wheel 41 in two stages. As pointed out above, the pneumatic action can act on one section at a time or on more than one section at a time. In either case, the sections 2 are moved down to the apertures 151 where they remain until the seizing action operates on one or more of the sections. At this point the sections are held from further advance toward the open end of the tube 41. The seizure is effected by the passage of air within the tube 9. Air is introduced into the tube 9 through the air line 19 to propel a section from the end of the tube toward or into the turret wheel 41.

For a description of the pneumatic action, reference is first made to FIG. 5. The blade wheel 34 is shown for intermittent interruption of the air which is introduced from the main line 23. When a blade 39 blocks the discharge end 27 the air is blown through the air line 19 to provide the air pressure mentioned above. This has an effect on the apparatus as shown in FIG. 7 of blowing from air line 19 into the tube 9 and out through the end of the tube 9 adjacent the turret wheel 41. A small portion of the forced air stream escapes through apertures 151. When the blade wheel 34 has no blades 39 blocking the discharge end 27, the air from the line 23 blows out through the discharge end 27 and does not blow down the air line 19. Rather a venturi 28 provided in the block 25 causes a reduced pressure at the connection 31 when the air is blowing directly out through the discharge end 27. This venturi sucks air back up tube 19 into the block 25 and thus reverses the air flow through air line 19 during this phase of the pneumatic action.

Referring to FIG. 7 the reverse flow of air in the air line 19 is drawn from the tube 9 through the open end of the tube and in lesser proportion through the apertures 151. Thus the air flows first one way and then another through the air line 19 by a transpiration out and an intake in the open end of the tube 9.

The row of apertures 151 provides a kick-off point for the sections 2 in their travel down the tube 9 to the turret wheel 41. This kick-off point is the point at which the pneumatic action arrests the vibratory motion of the sections 2 and the point from which the pneumatic action moves the sections for presentation to the turret wheel 41. The transpiration phase blows a section from the tube 9 into an awaiting ferrule 47 and also during the transpiration phase of the pneumatic cycle the next succeeding section or sections are moved from the kick-off point at apertures 151 up to the end of the tube 9. During the intake phase of the pneumatic cycle the sections 2 are held stationary in the tube 9 including those sections which have reached the kick-off point. As a result, the sections 2 are held at the kick-off point and at the end of the tube wherever they are located at the inception of the intake phase. The intake of air through apertures 151 is adjusted by the balance of factors so that it leaves the next succeeding section at the kick-off point undisturbed.

Referring to the successive movement of the sections 2 as illustrated in FIGS. 7–9, FIG. 7 shows an axial sectional view of the tube 9 in which three capacitor sections 2 are identified as X, Y and Z and are points of relative advancement toward the turret wheel 41. The section X is ready for moving into the ferrule 47 of the turret wheel 41. The section Y is held at the kick-off point of apertures 151 and Z has not yet reached the kick-off point. When air is injected into the tube 9 from the air line 19 during the transpiration phase, the section X which blocks the end of tube 9 partially closes the end of the tube 9 and causes back pressure within the tube 9. This back pressure escapes through the apertures 151 and serves to create a back pressure within the tube 9 up to the point of the row of apertures but not further up the tube than these apertures.

When the turret wheel 41 rotates to place an empty ferrule 47 at the end of the tube 9, the section X moves from its blocking position in the end of tube 9. While this is taking place the discharge end 27 is, of course, blocked by a blade 39 to provide the current of air through the line 19 for the transpiration phase. With the removal of section X from the end of the tube 9, the section Y is moved up to the end of the tube 9 as shown in FIG. 8. The transpiration phase closes with the section Y moved up to the end of tube 9 and the section Z moved into the kick-off point. The section Z is held at the kick-off point by the back pressure in the forced current of air caused by the section Y blocking the end of the tube 9. Referring to FIG. 5, the turret wheel 34 rotates to permit the discharge of air through the discharge end 27 and creates the intake phase of the pneumatic cycle. The intake of air through the apertures 151 and the end of the tube 9 as balanced to maintain the action Z at the kick-off point are shown in FIG. 8. In this balance so little air is drawn in through the apertures 151 that it leaves the section Z at the kick-off point. It will be understood that this balance is influenced by the angle $\theta$ at which the air line 19 is joined to the feeder tube 9. In this condition sections Y and Z await the rotation of turret wheel 41 and the approach of the next succeeding empty ferrule 47. As the ferrule 47 approaches the tube 9 end, the transpiration phase sets in by the blocking of the discharge end 27 with the next succeeding blade 39 as described above. During this next transpiration phase the section Y is moved into the next succeeding ferrule 47 and the section Z moves into the end of the tube 9 as shown in FIG. 9.

The sections are moved up under pneumatic action either one at a time or in a group from a point which has been referred to as the kick-off point. The kick-off point is the point at which the pneumatic action of the air pressure within the tube 9 takes hold of the sections and moves them torward the turret wheel 41. It is important that, in the synchronized action of the apparatus of this invention, the seizing of the sections not occur until the end of the tube is ready to receive the sections thus delivered. At the same time, it is important that they be moved against the turret wheel 41 as soon as the end of the tube 9 is available to receive the individual section. Accordingly, by moving the section to the end of the tube 9, after the preceding section has been taken up by the preceding ferrule 47, each section is presented at the tube 9 end at the earliest possible interval. The variety of sections 2 and the effect of this variation on the operation of the feed device makes necessary a feed means which allows an adaptability in the seizure and advancement of the sections. An automatic adjustment of the kick-off point will permit adaptation of a single feed means to sections of varying characteristics. In this way, the more sluggish sections can be fed to the ferrules 47 with the same alacrity as the more mobile sections. At the same time, the sections advancing down the tube 9 under the vibratory action are not subjected to excessive pressure or distortion.

In FIG. 7, the presence of section X between the apertures 151 and the end of the tube creates a back pressure which will retain capacitor section Y at the kick-off point. The ferrule 47 for section X is seen at the end of tube 9. The section Y is advanced ready for delivery to the turret wheel 41 before the next ferrule 47 arrives as shown in FIG. 8. This insures positive blocking of the open end of tube 9 to retain section Z at the kick-off point and also insures the reception of the section Y in the ferrule without crushing. It has been found helpful, but not necessary, to provide a hesitation in the turret wheel advance at the instant of positioning the capacitor sections 2 in their respective ferrules 47.

In FIG. 8, the section Y is shown in the position of section X in FIG. 7. Meanwhile, section Z has assumed the position of section Y in FIG. 7. The advanced section Y now blocks the opening of the tube 9 and causes a reversal of the air flow back through the apertures 151. This serves to hold up the next succeeding section Z as the advanced section Y had previously been held up by its respective preceding section X. Thus, it is seen that the sections 2 may be fed one at a time from the kick-off point at the apertures 151. The sections 2 may be successively positioned in the end of the tube 9, ready and waiting for their respective ferrules 47. It will be understood that the sections 2 may be moved in groups as well as individually.

The type of movement through the tube 9 which is desired of the sections 2 falls into two general categories. The first is the general movement of the sections 2 down the tube 9 from the hopper 1. The second is the more specific movement of the sections 2 from the tube 9 into the ferrules 47 positioned around the wheel 41. The purpose of the first movement is simply to place the sections 2 individually and successively at a point where the second movement will deliver them to the turret wheel 41 in timed relationship to the ferrule revolution. The speed of operation attainable with this device requires that this feed with its two phases be continuous and free of clogging or jamming which would cause an interruption in the feed of the sections 2 and the soldering of the sections 2. At the same time, the constant positioning of the sections 2 must be rapid and in synchronism with the revolution of the ferrules 47 past the end of the tube 9.

The section loading position on the turret wheel 41, that is, the point at which the ferrules 47 of the turret wheel 41 progressively receive the sections 2 being propelled from the tube 9, is indicated generally at point 50 in FIG. 11. It is at this point 50 in the path of rotation of the turret wheel 41 that the ferrules 47 receive the sections 2. To prevent the sections from passing through and beyond the ferrule 47 as they are propelled into the ferrules, a back stop plate 51 is mounted as shown in FIG. 11 of the drawing to lie immediately adjacent that face of the turret wheel 41 opposite the section feed side of the turret wheel 41.

The sections are expelled from the ferrules at a point 53 in the path of the section of the turret wheel 41 (see FIG. 10) after the section ends have been soldered and moved beyond the soldering station. An air blast line 55 is supported immediately adjacent point 53 as shown in FIG. 11 of the drawing. A continuous stream of air passes through the line 55 and as the section-loaded ferrule 47 approaches point 53, the air strikes the section to urge or expel it from the ferrule 47. A chute 57 catches the ferrules as they are discharged and conveys them to a suitable collecting unit (not shown).

In operation, first referring to FIG. 3, the sections 2 travel in progressive manner from the vibratory supply feed hopper 1 into the feed tube 9 supported upon the feed track 8. Vibratory motion is transferred to the spring-mounted feed track 8 through a resilient bumper 14 secured to the end of the track 8 and which lies in contact with the supply hopper 1.

The sections 2 pass from the hopper 1 into the feed tube 9 as described above. In the feed tube 9 the virbratory action advances the sections 2 down the tube 9 to the kick-off point shown in FIG. 7. The further movement of any particular section 2 depends upon the conditions further down the tube. In accordance with the operation of the pneumatic action described above, the section 2 is held at the kick-off point for its respective advancement into its respective ferrule 47. The sections are thus progressively propelled in a timed manner into the turret wheel 41.

The above described apparatus and method are illustrative of the invention. Additions and modifications may be made. For example, a photocell may be employed to stop the vibration of the hopper. The photocell control is attached at the tube 9 to be actuated by the passage of sections through the tube 9. The tube 9 is translucent in the area opposite the photocell. In the photocell attachment, a beam is projected across the tube 9 at the apertures 151. The photocell, when actuated by a section remaining in the zone of the apertures 151, will turn off the vibratory hopper 1. As mentioned in connection with FIGS. 7–9, the delivery of the air from the pneumatic means into the ejection end of the tube 9 can be projected at various angles less than ninety degrees but preferably is not directed vertically into the feed tube at a ninety degree angle. Further, it is noted that the application of solder as described in the above embodiment shows simultaneous application to both end of a capacitor section. This is the preferred method for the conventional capacitor section. However, it will be understood that single ended soldering of one end at a time is possible with this invention. The adaptability of this machine to soldering one end at a time is an advantageous feature.

The means for passing the capacitor sections across the solder applying discs has been illustrated by the preferred embodiment in a turret wheel carrying ferruels. It will be understood that any device that will take the section into the area between the solder discs and take it out again without crossing the centerline will be satisfactory. For example, a chain device may carry the capacitor sections; and, further, the capacitor sections may be moved into and out of contact with the soldering discs by a reciprocating motion so that the invention is not limited to a one-direction continuous motion in the movement of the capacitor sections across the solder discs.

Another feature of this invention is found in the flexibility of the feed characteristics of the stationary feed means. The feed tube is also fixed in position and does not have to shift to match the variation of the various sections in the turret wheel. The variations in capacitor sections can be taken care of by adjustments of the solder wheel and the rate of rotation of the turret wheel and other adjustments in connection with the soldering.

It will be understood that the gating means for producing the intermittent air flow described above, particularly in connection with FIGS. 7–9, may be modified without stopping the pneumatic action entirely. As long as the apertures are provided in the feed tube at a point more removed from the end of the tube than the joint with the air line, there will be a kick-off point. However, the reversal of air flow through the apertures is highly advantageous in feeding capacitor sections to the turret wheel. One of the purposes of these apertures is to allow the air in the feed tube to escape during that period when a section blocks the tube end in awaiting for the next empty ferrule. The air flow reversal occurs when the gating action causes an intake of air rather than an exhalation of air. As pointed out above, the intake of air through the apertures in this phase is preferably adjusted so that it is just enough to allow the next succeeding sections at the kick-off point to remain stationary. The advantage of this feeding means lies in the fact that the sections are handled carefully. Some sections have extended foil margins which would be deformed by undue pressure against the turret wheel. The escape of air through the apertures relative such pressure so that there will not be a jamming of the section against the turret wheel; and, when the shutter valve is open, there is an intake at the end of tube 9 which sucks the section 2 away from the turret wheel.

It is a further feature of this invention that a great variety of convolutely wound capacitor sections can be processed according to the principles of this invention and satisfactorily soldered. Also, extended foil sections are particularly well handled by this invention. The soldering that is effected is better than by hand.

From the above description, it is obvious that a new and novel soldering apparatus for soldering the ends of cylindrical objects such as capacitors has been invented. The prior time-consuming and expensive hand soldering methods can now be done away with in view of the above-described apparatus. Approximately 5,000 capacitors may be processed per hour with the above-described apparatus.

Obviously, may modifications and variations of the present invention are possible in the light of the above teachings. It is, therefore, to be understood that within the scope of the appended claims, the invention may be practiced otherwise than as specifically described.

What is claimed is:

1. Feed means for advancing articles from a supply to a work station comprising a vibrating supply of articles, a feed tube vibrated by said supply to receive articles from said supply in single file, fluid propulsion means joined to said feed tube at an acute angle, gating means regulating fluid flow through said fluid supply means in timed relation to said work station, control means in said feed tube adjacent the entry of said fluid propulsion means, whereby said articles are advanced singly from said entry point to said work station.

2. Feeding means for feeding cylindrical articles from a supply in timed sequence to a conveying means which comprises a vibrating supply of articles, a tubular conduit vibrated by said vibrating supply and receiving articles from said supply one at a time whereby said articles are fed into said tubular conduit and along said conduit by said vibration, said conveying means positioned at the opposite end of said conduit from said vibratory supply, means in said conveying means for carrying individual articles, and air ejection means for expelling said articles in sequence from said end of said conduit adjacent said conveying means, said air means comprising a supply of air under pressure, gating means between said air supply and said conveying means pulsing air from said air supply, a Y-point connecting said air supply into said tubular conduit at a point adjacent to but removed from said end of said conduit at said conveying means, a plurality of apertures in the wall of said conduit extending from said Y-point in line along said conduit in the direction away from said conveying means end.

3. A feeding means for feeding articles from a supply to a conveying means comprising a pneumatic means for advancing articles, a vibrating supply of articles, a tubular conduit receiving articles from said vibrating supply and oscillated by said vibrating supply, a Y-point connecting said conduit to said pneumatic means, an end of said conduit adjacent to but not in contact with a conveying means aligned ports in said conduit extending from said Y-point toward said vibrating supply, carrying members on said conveying means for receiving articles individually and successively from said conduit end, gating in said pneumatic means for providing intermittent blasts of gas through said pneumatic means to said conduit so timed as to successively act upon articles fed down said conduit and eject individual articles from said conduit end adjacent said conveying means and into said carrying members on said conveying means in timed relation to movement of said conveying means.

References Cited by the Examiner

UNITED STATES PATENTS

| 2,900,138 | 8/59 | Strate | 302—56 |
|-----------|------|--------|--------|
| 2,988,402 | 6/61 | Policansky | 302—2 |
| 2,993,737 | 7/61 | Stephen | 302—2 |
| 3,031,060 | 4/62 | Philippovic | 198—33.1 |

SAMUEL F. COLEMAN, *Primary Examiner.*

ANDRES H. NIELSEN, *Examiner.*